United States Patent [19]

Axelson et al.

[11] Patent Number: 5,035,467

[45] Date of Patent: Jul. 30, 1991

[54] SEATING SYSTEM

[75] Inventors: Peter Axelson; Michael Heinrich, both of Santa Cruz; Ann Lasko-Harvill, Palo Alto, all of Calif.; Michael W. Silverman, Highland Park, Ill.

[73] Assignee: Pin Dot Products, Niles, Ill.

[21] Appl. No.: 244,843

[22] Filed: Sep. 15, 1988

[51] Int. Cl.[5] .......................... B60N 1/02; A47C 1/12

[52] U.S. Cl. ...................................... 297/440; 297/284

[58] Field of Search ............... 297/330, 331, 218, 229, 297/440, 444, 397, 398, DIG. 4, 378, 250, 253, 254, 255, 170, DIG. 4, 284, 379, 352

[56] References Cited

U.S. PATENT DOCUMENTS

| | | | |
|---|---|---|---|
| 2,119,023 | 5/1938 | Pickard | 297/253 |
| 2,260,352 | 10/1941 | Trapini | 297/255 |
| 2,634,794 | 4/1953 | Young | 297/255 X |
| 2,710,647 | 6/1955 | Dorton . | |
| 3,171,686 | 3/1965 | Evers | 297/251 |
| 3,279,848 | 10/1966 | Walker | 297/256 |
| 3,404,917 | 10/1968 | Smith | 297/250 |
| 3,594,039 | 7/1971 | Hard | 297/378 X |
| 3,632,165 | 1/1972 | Miller | 297/254 |
| 3,929,374 | 12/1975 | Hogan et al. . | |
| 3,945,651 | 3/1976 | Boswinkel . | |
| 3,947,067 | 3/1976 | Griefahn . | |
| 3,982,785 | 9/1976 | Ambasz . | |
| 4,120,530 | 10/1978 | Imbro . | |
| 4,157,203 | 6/1979 | Ambasz . | |
| 4,234,228 | 11/1980 | Flamm . | |
| 4,285,544 | 8/1981 | Zapf . | |
| 4,300,249 | 11/1981 | Taylor . | |
| 4,333,683 | 6/1982 | Ambasz . | |
| 4,362,335 | 12/1982 | Drabert et al. . | |
| 4,364,603 | 12/1982 | Johnson . | |
| 4,408,800 | 10/1983 | Knapp . | |
| 4,458,942 | 7/1984 | Crossman . | |
| 4,471,994 | 9/1984 | Zund et al. . | |
| 4,533,177 | 8/1985 | Latone . | |
| 4,555,136 | 11/1985 | Dranger . | |
| 4,573,736 | 3/1986 | Kevenberg . | |
| 4,574,901 | 3/1986 | Joyner . | |
| 4,603,904 | 8/1986 | Tolleson . | |
| 4,618,185 | 10/1986 | Kaufman . | |
| 4,626,028 | 12/1986 | Hatsutta et al. . | |
| 4,629,249 | 12/1986 | Yamaguchi . | |
| 4,640,547 | 2/1987 | Fromme . | |
| 4,641,884 | 2/1987 | Miyashita et al. . | |
| 4,652,049 | 3/1987 | Maruyama . | |
| 4,685,730 | 8/1987 | Linguanotto . | |
| 4,687,250 | 8/1987 | Esche . | |
| 4,688,851 | 8/1987 | Whiteford . | |
| 4,703,974 | 11/1987 | Brauning . | |
| 4,707,028 | 11/1987 | Gamberini . | |
| 4,709,963 | 12/1987 | Uecker et al. . | |
| 4,711,491 | 12/1987 | Ginat . | |
| 4,712,835 | 12/1987 | Warrick . | |
| 4,728,150 | 3/1988 | Gaudreau, Jr. . | |
| 4,730,871 | 3/1988 | Sheldon . | |
| 4,733,910 | 3/1988 | Brennan . | |
| 4,744,603 | 5/1988 | Knoblock . | |
| 4,934,755 | 6/1990 | Berghoff | 297/284 |

*Primary Examiner*—Peter A. Aschenbrenner

*Attorney, Agent, or Firm*—Emrich & Dithmar

[57] ABSTRACT

A seating system includes seat and back internal support frames disposed within respective foam-filled seat and back cushions which each have an outer fabric cover. The back assembly is provided with a pair of quick-release clip locks, while the seat assembly includes a plurality of support hooks in combination with mounting brackets and locking mechanisms to facilitate quick mounting and removal of the seat from a support frame such as a wheelchair base. The seat and back assemblies are coupled together in a pivoting manner by means of a handle assembly which allows the seat to be compactly folded and easily carried when removed from a support base. The back inner support frame includes upper and lower support subassemblies pivotally coupled by means of a hinge joint which allows for extension of the lumbar region when the upper support subassembly is moved rearwardly to a reclined position. The seat and back support surfaces are contoured for user comfort and support while a lower, aft portion of the back cushion is provided with a plurality of corrugations to facilitate its flexure. The internal support frame includes telescoping members to allow the internal frame to fit a range of user sizes while the hinge joint in the lower portion of the back assembly may: (1) be locked in a fixed orientation; (2) incorporate forward and aft stops to limit pivoting displacement of the upper back; or (3) have a selected neutral position to which the upper back is biased.

22 Claims, 8 Drawing Sheets

SEATING SYSTEM

Background of the Invention

This invention relates generally to seating systems and is particularly directed to an articulating seating arrangement which is easily mounted to and removed from, or incorporated into the overall design of, a support base, such as a wheelchair, an office chair base, etc., and which can be easily carried and stored when thus removed.

Wheelchair seating and support arrangements have undergone considerable evolution from the early seat and back flexible support straps. There is currently much interest and considerable effort is being expended in the development of wheelchair seating and support arrangements which provide as comfortable an environment as possible for the enhanced well-being and productivity of the wheelchair-user. These efforts have led to the development of contoured seat and back surfaces which are designed to relieve pressure spots and, in some cases, to provide support and to enhance the function of the user. Although these wheelchair seating systems are frequently detachable from the wheelchair base, when removed from the wheelchair they are generally heavy, bulky and awkward to handle.

Present wheelchair seating systems also are characterized by a rigid frame which does not allow for repositioning of the user, e.g., changing the angle between the seat and back portions. Some wheelchair seating arrangements have allowed for variation in the angle of recline but make use of complicated and expensive pivoting structures which are adapted for fitting to a conventional wheelchair base. These latter arrangements are integral with the wheelchair structure and are thus not usable with another base. In addition, because of its complexity and considerable cost this latter approach is generally beyond the financial means of most wheelchair users.

Variation in the back-seat angle is highly desirable particularly for one confined to a wheelchair. For example, changing the back-seat angle allows for a redistribution of weight and a reduction in the possibility of pressure-related problems. Varying the angle of recline also requires active muscular activity by the user which further promotes the well-being of the wheelchair-user. Finally, extension of the spine such as occurs when "arching" one's back is highly desirable for various anatomical reasons relating to such diverse areas as digestion, muscle tone, support, etc. While the discussion above is primarily directed to wheelchair support arrangements, it is equally applicable to virtually all other types of seating support arrangements. Thus, prior art seating systems, in general, suffer from various limitations and are in need of improvement.

The present invention provides the aforementioned advantages while avoiding the limitations of the prior art discussed above by making use of seat and back assemblies coupled together in a pivoting manner by means of a conveniently gripped handle. The pivotally coupled seat and back assemblies may thus be folded to a compact configuration for transport and storage or may be extended to the use configuration wherein they are easily and securely coupled as a unit to a support frame such as a wheelchair, an office support base, or other means of support. Each of the seat and back assemblies includes a respective inner support structure disposed within a foam cushion which, in turn, is provided with an outer cover. The inner support structure of the back assembly is further provided with a hinged, lower portion to allow for flexion and extension of the spine. In other embodiments, the hinged back assembly may be coupled by itself to a support base or the flexible seating system may be integrated in a rigid chair frame while still allowing for flexion and extension of the spine.

OBJECTS AND SUMMARY OF THE INVENTION

Accordingly, it is an object of the present invention to provide a seating system which is easily attached to and removed from a support base.

It is another object of the present invention to facilitate the secure mounting of a seat arrangement to a support base in an automobile, aircraft, wheelchair, office, theater, or other seated environment, as well as its easy removal therefrom, whereupon the seat arrangement can be folded into a compact structure having a handle to facilitate its transport and storage.

Yet another object of the present invention is to provide improved comfort in an automobile, aircraft, wheelchair, office, theater, or other seated environment by allowing for flexure of the seat back and extension of the lumbar region of a user.

A further object of the present invention is to provide a seat arrangement comprised of seat and back cushions as well as an internal support structure within the cushions which may be accessed following assembly of the cushions about the support structure to allow the support characteristics of the seat arrangement to be adjusted for an individual user.

A still further object of the present invention is to provide a seating arrangement particularly adapted for installation in a wheelchair base which provides improved lumbo-sacral support, easy re-orientation of the seat and back support surfaces, user contoured seat and back support surfaces, and easy adjustment of the height and seat position to facilitate the exercise of control over the wheelchair by a user.

It is yet another object of the present invention to provide a seating arrangement that provides improved lumbar sacral support, and contoured seat and back support surfaces for incorporation into an automobile, aircraft, wheelchair, office, theater, or other seated environment.

Still another object of the present invention is to provide a more comfortable and aesthetically pleasing seating arrangement for use with a support base in an automobile, aircraft, wheelchair, office, theater, or other seated environment.

Another object of the present invention is to provide a seat structure adapted for incorporation into an automobile, aircraft, wheelchair, office, theater, or other seated environment, which affords pivoting displacement between the seat and back portions as well as flexure in the lower back support area.

Still another object of the present invention is to provide a seating system which utilizes the user s own energy to initiate lumbar sacral extension.

A still further object of the present invention is to provide a seating system in which slight changes in the user's body position effect changes in the position of the musculature in the user's back for greater endurance and sitting tolerance.

Another object of the present invention is to provide a seating system that allows for adjustment and restriction in the range of extension and flexion of the back as desired by the user for comfort.

A further object of the present invention is to provide a seating system that allows for bias of a specific lumbar sacral posture with an external structure which permits adjustment in bias to a desired lumbar sacral posture.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures in which:

DETAILED DESCRIPTION OF THE PREFERRED EMBODIMENT

Figure 1:
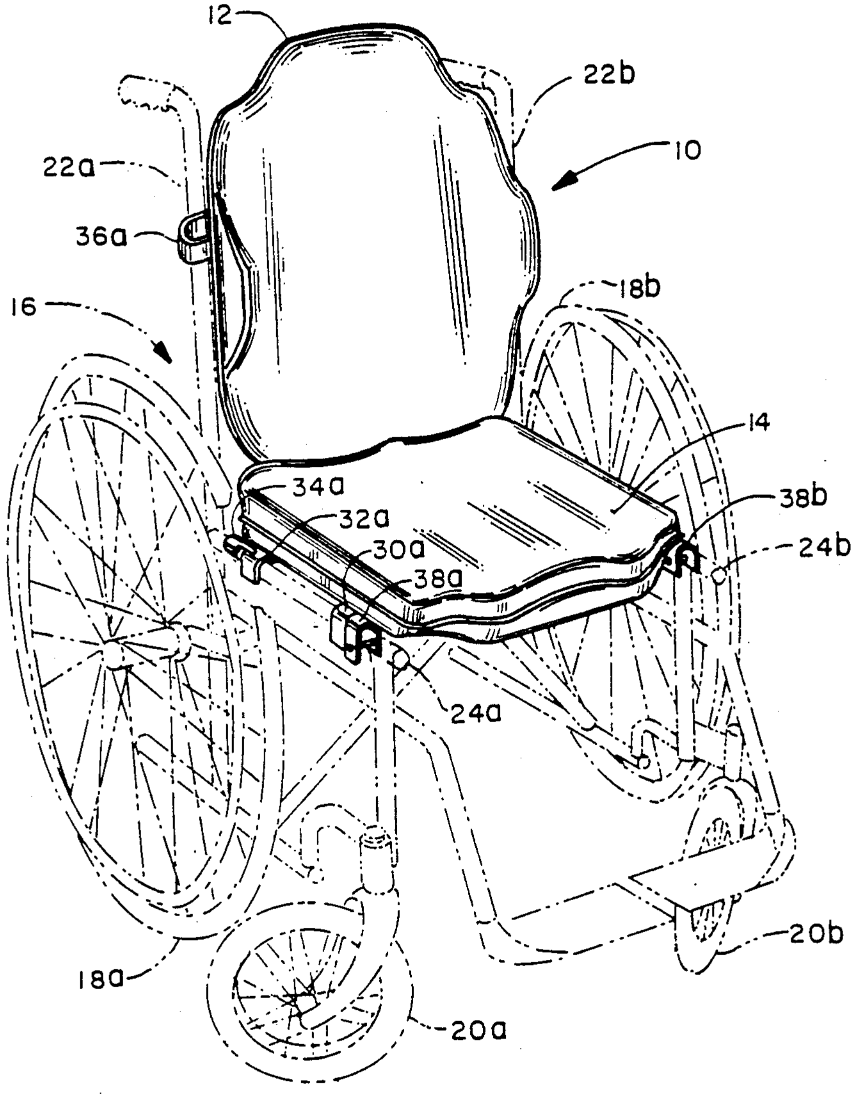
FIG. 1 is a perspective view of a foldable, flexible seating system in accordance with the present invention installed in a conventional wheelchair which is shown in phantom.

Referring to FIG. 1, there is shown a perspective view of a seating system 10 which is particularly adapted for use with a wheelchair base 16 (shown in dotted line form), although it is not limited to use with a wheelchair and may be used with virtually any support base.

The wheelchair base 16 illustrated is of the conventional type and includes right and left aft wheels 18*a*, 18*b* as well as right and left forward wheels 20*a*, 20*b*. The terms "right" and "left" are used with the wheelchair base 16, as well as the seating system 10, viewed from the rear. The wheelchair base 16 further includes right and left vertical support members 22*a*, 22*b* as well as right and left horizontal support members 24*a*, 24*b*. A back assembly 98 of the seating system 10 is adapted for secure coupling to each of the vertical support members 22*a*, 22*b*, by means of a pair of clip locks, with the right clip lock 36*a* shown in the figure. Disposed on the lower, lateral portion of a seat assembly 96 of the seating system 10 are a pair of forward drop locks and a pair of aft drop hooks, with the right forward drop hook 30*a* and the right aft drop hook 32*a* shown in the figure. The seat assembly 96 is positioned upon and supported by the pair of horizontal support members 24*a*, 24*b* by positioning its forward drop lock and aft drop hook upon and in engagement with the aforementioned wheelchair horizontal support members. Disposed on each of the horizontal support members 24*a*, 24*b* is a respective mounting bracket, with the right mounting bracket 34*a* illustrated in the figure, for securely attaching an aft portion of the seat assembly 96 to the wheelchair base 16. A pair of forward mounting brackets 38*a*, 38*b* are mounted to the horizontal support members 24*a*, 24*b* immediately forward of the drop hooks 30*a*, 30*b* to limit forward movement of the seating system 10 on the wheelchair base 16. The wheelchair base 16 also typically includes a pair of armrests disposed above and adjacent to lateral portions of the seat assembly 96, but these are not shown in the figure for simplicity.

Figure 2:
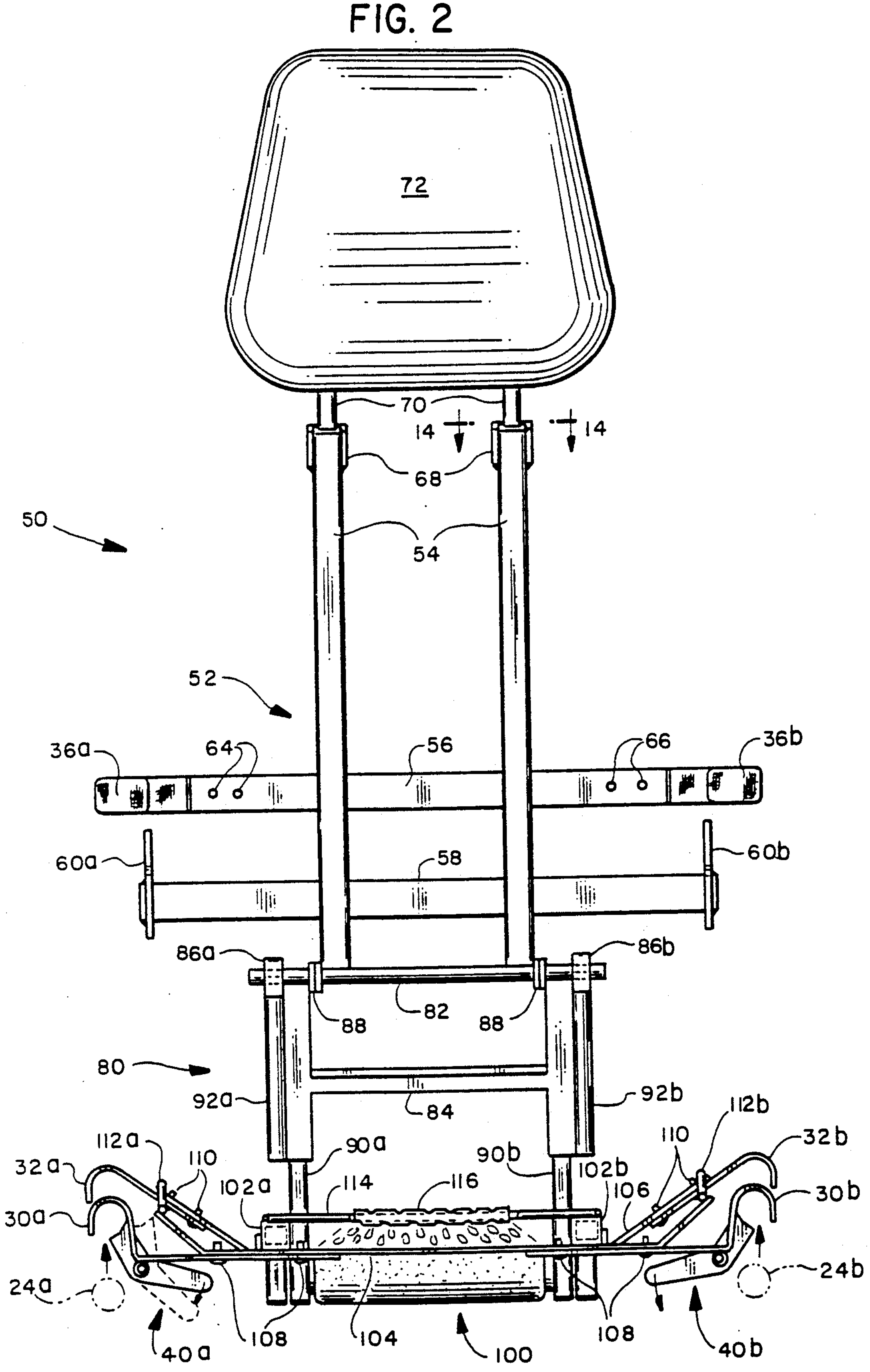
FIG. 2 is a front elevation view of the internal support structure of the foldable, flexible seating system of the present invention.

Referring to FIG. 2, there is shown a front elevation view of an internal·support frame 50 for use in the foldable, flexible seating system of the present invention. The internal support frame 50 includes an upper back support frame 52, a lower back support frame 80, and a seat support frame 100. The upper back support frame 52 is pivotally coupled to the lower back support frame 80, while the lower back support frame is also pivotally coupled to the seat support frame 100. The details of the manner in which these various components of the internal support frame 50 are pivotally coupled together are provided in the following paragraphs.

The upper back support frame 52 includes a pair of spaced, elongated, linear telescoping frame members 54. Each of the telescoping frame members 54 is tubular and is adapted to receive a respective support tube 70 which, in turn, is coupled to a headrest 72 The telescoping relationship between the support tubes 70 and the frame members 54 allows the height of the headrest 72 to be adjusted as desired. The upper end of each of the upper back telescoping frame members 54 is provided with a respective friction lock 68 to allow for secure engagement of each of the telescoping frame members with its associated support tube 70 in a locking manner.

Figure 3:
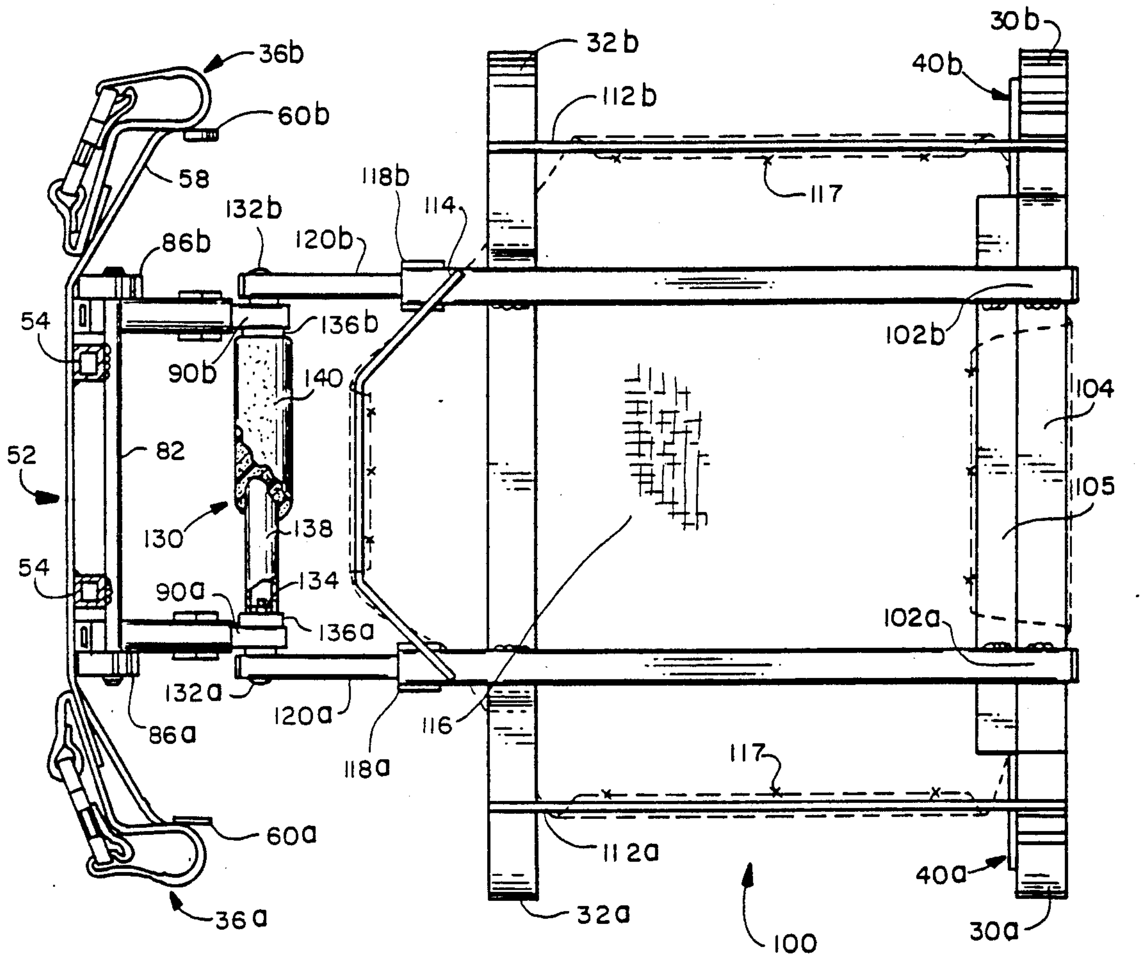
FIG. 3 is a top planar view of the internal support structure of the foldable, flexible seating system of the present invention.

Coupled to each of the upper back telescoping frame members 54, preferably on the rear surfaces thereof, is an elongated upper back lateral frame member 56, which is oriented generally transverse to the longitudinal axes of the telescoping frame members. Also coupled to each of the telescoping frame members 54 is a lateral support strap 58 which is disposed below and in a spaced manner from the lateral frame member 56. The lateral support strap 58 is also oriented generally transverse to the longitudinal axes of the upper back telescoping frame members 54. The upper back lateral frame member 56 and the lateral support strap 58 are shaped so as to approximate the contour of the back of a user as shown in the top plan view of the internal support frame 50 illustrated in FIG. 3. In a preferred embodiment, the upper back telescoping frame members 54, the upper back lateral frame member 56 and the lateral support strap 58 are comprised of a high strength metal and are coupled together by conventional means such as weldments to form the upper back support frame 52. The present invention also contemplates the use of an upper back lateral frame member 56 and a lateral support strap 58 which are malleable and thus can be shaped to conform generally to the back contour of a user, yet are strong enough to provide sufficient support.

Disposed on respective ends of the upper back lateral frame member 56 are right and left clip locks **36*a*, 36*b*. The right clip lock 36*a* is coupled to a first end of the upper back lateral frame member 56 by conventional means such as threaded mounting pins 64, while the left clip lock 36*b* is coupled to a second end of the lateral frame member also by means of a plurality of mounting pins 66. Each of the aforementioned right and left clip locks 36*a*, 36*b* is adapted for secure coupling to a respective upright portion of the wheelchair frame in a manner described below which facilitates mounting and removal of the seating system of the present invention from a wheelchair base. Securely attached to a first end of the lateral support strap 58 is a right lateral support tab 60*a*, while a left lateral support tab 60*b* is securely attached to the opposite end of the lateral support strap 58. With the lateral support strap 58 disposed within a foam cushion, the right and left lateral support tabs 60*a*, 60*b*** provide additional strength and stability for the seat back.

Rigidly coupled to each of the respective lower ends of the upper back telescoping frame members 54 is a hinge pin 82 which is oriented transverse to the longitudinal axes of the telescoping frame members. Disposed on respective ends of the hinge pin 82 are right and left clamps **86*a* and 86*b*. Each of the clamps 86*a*, 86*b* is securely coupled to an H-shaped frame member 84 within the lower back support frame 80. Spacer washers 88 are disposed between the H-shaped frame member 84 and each of the upper back telescoping frame members 54 to facilitate rotational displacement about the hinge pin 82 of the lower back support frame 80 relative to the upper back support frame 52. Each of the clamps 86*a*, 86*b* is of the C-type and is adapted to receive the hinge pin 82 as well as a locking bolt 158 as shown in the side sectional view of FIG. 4. Tightening of the locking bolt 158 draws adjacent portions of the clamp 86*a* toward one another along the slit therein to increase clamp engagement of the hinge pin 82. With each of the clamps 86*a*, 86*b* rigidly coupled to the H-shaped frame member 84 of the lower back support frame 80, the upper back support frame 52** may be either locked in a rigid orientation relative to the lower back support frame or may be capable of rotational displacement relative to the lower back support frame with the magnitude of the force required for such rotation established as desired by adjustment of each of the end clamps.

Disposed within a back cushion 150 and positioned adjacent to respective lateral portions of the H-shaped frame member 84 are right and left hollow tubes **92*a* and 92*b*. Each of the hollow tubes 92*a*, 92*b* is positioned in abutting contact with a respective one of the clamps 86*a*, 86*b* and is disposed about the locking bolt 158 therein. The hollow tubes 92*a*, 92*b* may be securely coupled to respective lateral portions of the H-shaped frame member 84 by conventional means such as tape, epoxy cement, etc. The hollow tubes are preferably comprised of plastic and permit each of the locking bolts 158 to be adjusted after the foam cushion is disposed about the internal support frame and the seating system is assembled. This is accomplished by merely punching a hole in the cushion cover immediately adjacent to the end of each of the hollow tubes 92*a*, 92*b*. By inserting a screwdriver into the hollow tube the locking bolt 158 may be accessed for tightening or loosening depending upon the desired degree of tight-fitting coupling between the clamp and the hinge pin 82. Wrapping of the hollow tubes 92*a* and 92*b* as well as the clamps 86*a* and 86*b*** also prevents foam from accessing these movable parts during the foaming process and preventing their subsequent adjustment.

Figures 4, 4A:
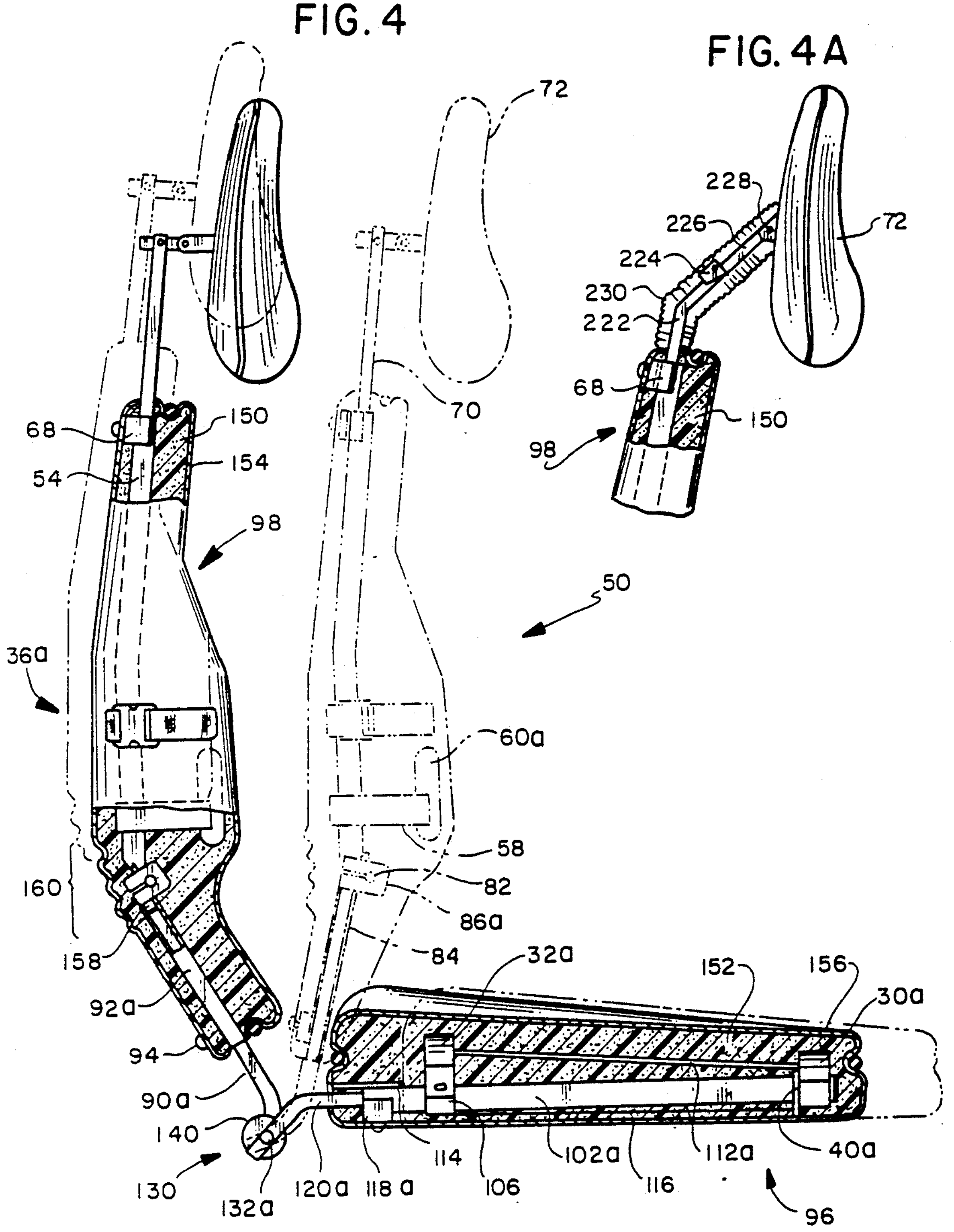
FIG. 4 is a lateral sectional view of the foldable, flexible seating system of the present invention illustrating several different orientations shown in phantom of the back assembly thereof.
FIG. 4A is a lateral sectional view of an upper portion of the back assembly of the seating system illustrating details of a headrest mounting arrangement for use with the present invention.

A pair of lower friction locks 94 are positioned on lower respective portions of the H-shaped frame member 84 and are adapted to receive a respective one of right and left back angle hinge bars **90*a* and 90*b*. Each of the back angle hinge bars 90*a*, 90*b* is adapted for insertion within a respective lower portion of the H-shaped frame member 84 in a telescoping manner to permit the length of the lower portion of the back assembly 98 to be adjusted as desired in accordance with the dimensions of a user. As shown in FIG. 4, each of the upper friction locks 68 used to support the headrest 72 and each of the lower friction locks 94 is accessible from the outer surface of the back cushion 150. Thus, the height of the headrest 72 relative to the back assembly 98 and the length of the lower portion of the back assembly may be fixed as desired after the seating system is assembled and has been placed in use. It should also be noted here that while the upper back support frame 52 and the lower back support frame 80 are entirely disposed within the back cushion 150, the right and left clip locks 36***a*, 36*b* are disposed outside of the back cover 154 and are mounted to respective ends of the upper back lateral frame member 56 by inserting mounting pins through the back cover and into respective ends of the lateral frame member.

The aft surface of the back cushion 150 is provided with a plurality of spaced corrugations 160 to facilitate its flexure. The corrugations, or ridges, 160 allow the aft surface of the cushion cover 154 to be stretched and compressed without distortion or tearing and provide an attractive appearance for the seating system. By increasing the number of corrugations and their depth in the back cushion 150, the back assembly 98 may be made more flexible and thus more easily re-configured by a user. Similarly, reducing the depth of as well as the number of corrugations 160 in the back surface of the back cushion 150 reduces the flexibility of the back assembly 98 and provides increased resistance to its bending. Thus, the resistance of the back assembly 98 to flexure can be tuned by appropriate selection of the number and depth of corrugations in the back cushion 150. The resistance of the back assembly 98 to flexure may also be tuned by appropriate selection of the type of foam used in the back cushion 150, with a more rigid foam providing increased resistance to back assembly flexure.

The seat support frame 100 includes right and left telescoping frame members 102*a* and 102*b*. The seat support frame 100 further includes front and rear seat straps 104 and 106 oriented transverse to the telescoping frame members 102*a*, 102*b* and coupled thereto by conventional means such as weldments. The outer ends of the front and rear seat straps 104, 106 are turned upward where the seat straps extend beyond the right and left telescoping frame members 102*a*, 102*b*. Attached to adjacent end portions of the front and rear seat straps 104, 106 are right and left side perimeter wires 112*a* and 112*b*. With the end portions of the rear seat strap 106 positioned slightly higher than the end portions of the front seat strap 104, each of the side perimeter wires 112*a* and 112*b* rises slightly as it extends rearwardly within the seat support frame 100. A forward reinforcing member 105 may also be positioned across and coupled to the right and left telescoping frame members 102*a*, 102*b* for increasing the strength of the seat support frame 100. The forward reinforcing member 105 is also adapted for coupling to the forward drop hooks 30*a*, 30*b* and allows the drop locks to be positioned further aft in the seat assembly 96 permitting the seat assembly to be mounted further forward in the wheelchair base 16. A rear perimeter wire 114 extends rearwardly of and between the right and left telescoping frame members 102*a*, 102*b* and is coupled thereto. As in the case of the upper and lower back support frames 52, 80, the seat support frame 100 is preferably comprised of high strength metallic components which are coupled together by conventional means such as weldments. However, other well known structural materials, such as various high strength plastics, could be used in forming the internal support frame used in the foldable, flexible seating system of the present invention.

An oval nylon webbing, or netting, 116 is positioned on the seat support frame 100 in a stretched manner. While nylon webbing is contemplated for use in one embodiment of the present invention, other thin, flexible structures, such as metal mesh, may be used in this invention. The nylon webbing 116 may be securely maintained in position upon the seat support frame 100 by conventional means such as nylon, or wire, ties 117. The nylon webbing 116 forms a structural surface within the seat cushion 152 as shown in FIG. 4 and may be used to control the firmness of the seat assembly 96. Thus, by increasing the tension of the netting 116, the seat assembly 96 may be made more firm. A reduction in the tension of the netting 116 will result in a corresponding reduction in the firmness of the seat cushion 152. Changing the location of the netting 116 within the seat cushion 152 also has an effect on the seat cushion's firmness. For example, positioning the netting 116 close to the upper surface of the seat cushion 152 tends to increase its firmness. On the other hand, where the netting 116 is disposed in close proximity to the lower surface of the seat cushion 152, as shown in FIG. 4, the cushion will have reduced firmness.

Disposed adjacent to the aft ends of the right and left telescoping frame members 102*a*, 102*b* are right and left friction locks 118*a*, 118*b*, respectively. The aft end of each of the telescoping frame members 102*a*, 102*b* is adapted to receive a respective one of the right and left seat angle hinge bars 120*a* and 120*b*. The length of the seat support frame 100 may be established by allowing the desired length of each of the right and left seat hinge angle bars 120*a*, 120*b* to extend respectively from the right and left telescoping frame members 102*a*, 102*b*. The right and left seat angle hinge bars 120*a*, 120*b* may then be securely locked in position by means of a respective one of the friction locks 118*a* and 118*b*. Again, as particularly shown in FIG. 4, each of the friction locks 118*a* and 118*b* may be accessed after fabrication of the seat assembly 96 and through an aperture within the seat cover 156.

Securely coupled to respective ends of the front seat strap 104 are right and left forward drop hooks 30*a* and 30*b*. Each of the aforementioned forward drop hooks 30*a*, 30*b* is securely attached to the front seat strap 104 by means of a plurality of threaded mounting pins 108. Similarly, aft drop hooks 32*a*, 32*b* are coupled to respective ends of the rear seat strap 106 by means of a plurality of mounting pins 110. The right forward and aft drop hooks 30*a*, 32*a* are adapted for receiving and engaging a right horizontal support member 24*a* of the wheelchair frame. Similarly, the left forward and aft drop hooks 30*b*, 32*b* are adapted to receive and engage a left horizontal support member 24*b* of the wheelchair frame. In this manner, the seat assembly 96 may be positioned upon a wheelchair frame and maintained thereon in a secure and stable manner.

Disposed on respective aft ends of the right and left telescoping frame members 102*a* and 102*b* are friction locks 118*a*and 118*b*. The aft ends of each of the right and left telescoping frame members 102*a*, 102*b* are adapted to receive in sliding engagement along the length thereof a respective one of right and left seat angle hinge bars 120*a* and 120*b*. Each of the seat angle hinge bars is adapted for insertion within a respective one of the frame members 102*a*, 102*b* in a telescoping manner and is securely maintained in position therein by means of a respective one of the friction locks 118*a*, 118*b*. By thus setting the length of the seat angle hinge bars 120*a*, 120*b* which extend rearwardly from the telescoping frame members 102*a*, 102*b*, the length of the seat assembly 96 may be adjusted as desired depending upon the size of the user. As in the case of the back assembly 98 described above, each of the friction locks 118*a*, 118*b* is accessible from outside of the seat cushion 152 by means of a tightening screw inserted through an aperture in the seat cover 156.

The aft ends of the right and left seat angle hinge bars 120*a*, 120*b* are respectively coupled to lower ends of the right and left back angle hinge bars 90*a* and 90*b* by means of respective coupling bolts 132*a* and 132*b*. Each of the coupling bolts 132*a*, 132*b* is inserted through apertures in the end portions of the seat and back angle hinge bars and is maintained in position by means of a respective lock nut 134 as shown for the case of the right coupling bolt 132*a* in FIG. 3. A washer/spacer is disposed between adjacent ends of the thus coupled seat and back angle hinge bars to facilitate rotational displacement therebetween.

Figure 5:
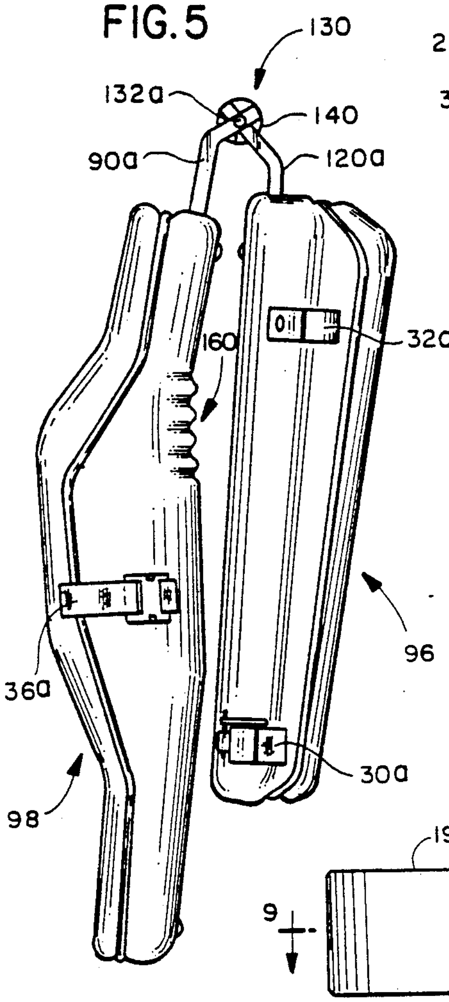
FIG. 5 is a side elevation view of the foldable, flexible seating system of the present invention illustrating the seat and back portions in the folded configuration.

An elongated, inner tube 138, preferably comprised of polyvinyl chloride (PVC), is disposed between and in contact with right and left caster inserts 136*a* and 136*b* which are each maintained in position by means of a respective combination of the aforementioned coupling bolts and nuts. Thus, with each of the caster inserts 136*a*, 136*b* securely maintained in contact with facing, inner surfaces of the back angle hinge bars 90*a*, 90*b*, the inner tube 138 is also securely maintained in position between the ends of the back angle hinge bars. Disposed about and along the length of the inner tube 138 is a handle cover 140. All of the aforementioned components form a pivoting handle 130 which not only permits the seat and back assemblies to be pivotally displaced toward and away from one another, but also allows the entire seating system, when compactly folded as shown in FIG. 5, to be grasped and lifted for transport.

In the embodiment illustrated in the various figures, the back and seat angle hinge bars 90*a*, 90*b* and 120*a*, 120*b* are each provided with a 45° bend adjacent to their respective ends. This angular offset of the seat and back assemblies 96, 98 adjacent to where they are pivotally coupled together allows the seat components to become aligned when in the folded configuration so as to assume a compact shape as shown in FIG. 5. The present invention is not limited to this specific angular configuration of the adjoining portions of the seat and back assemblies 96, 98, but will work equally as well if each of the aforementioned seat and back angle hinge bars is reversed in its angular orientation. By reversing each of the coupled seat and back angle hinge bars, the seating system 10 of the present invention provides a different mechanical action as it is displaced from a generally upright orientation to a reclined position. This feature of the present invention allows for increased flexibility in terms of the degree of lumbar extension available and the location of flexure between the back and seat assemblies. Thus, different lengths and angles of back and seat angle hinge bars 90*a*, 90*b* and 120*a*, 120*b* allow virtually any desired back flex characteristics to be incorporated in the seating system of the present invention in accordance with the desires and needs of a seating system user. Variation in the angle of bend as well as the location of the bend and the length of these angle hinge bars allows the location of the pivot point to be changed resulting in a change in the path of extension that occurs when leaning back in the seating system.

Figure 1A:
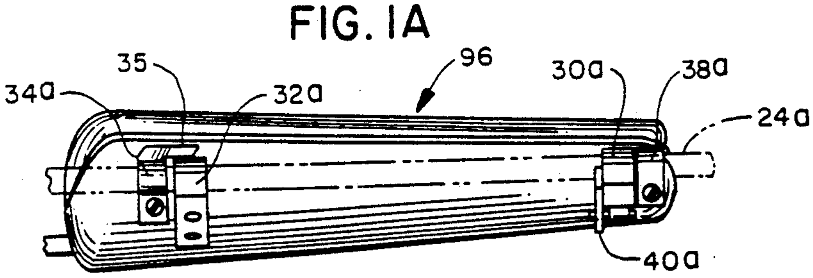
FIG. 1A is a side view shown partially in phantom of the manner in which the seat assembly of the present invention is positioned upon and coupled to a wheelchair base.
Figure 6:
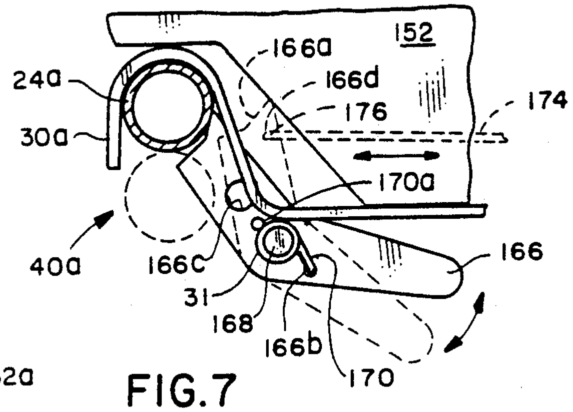
FIG. 6 is a front view of a cam lock arrangement for securely coupling the seat assembly to a wheelchair frame member which also facilitates decoupling and removal of the seat from the wheelchair.
Figure 7:
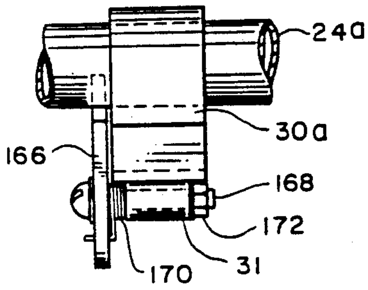
FIG. 7 is a side view of the cam lock arrangement of FIG. 6.

Referring to FIGS. 6 and 7, there are respectively shown front and side views of the right locking mechanism 40*a* which securely attaches a lateral portion of the seat assembly to a horizontal support member 24*a* within the wheelchair frame. A similar arrangement is provided for in the left locking mechanism. Additional details of the manner in which the seat assembly 96 of the invention is attached to a wheelchair frame are shown in FIG. 1A and discussed below.

The seat assembly 96 is positioned upon and secured to a wheelchair base in the following manner. Each of the right and left aft drop hooks 32*a*, 32*b* is positioned upon a respective right and left horizontal support member 24*a*, 24*b* and is moved rearwardly immediately adjacent to a respective one of a pair of right and left mounting brackets. As shown in FIG. 1A for the case of the right mounting bracket 34*a*, each of the mounting brackets is securely coupled to a respective one of the horizontal support members such as by means of a nut and bolt combination and includes a forwardly extending finger 35 which is spaced above the horizontal support member and is adapted to receive and engage a drop hook positioned adjacent thereto. The finger portion 35 of the mounting bracket maintains the aft drop hook 32*a* in intimate contact with the horizontal support member 24*a* of the wheelchair frame 16.

With each of the right and left aft drop hooks 32*a*, 32*b* positioned immediately adjacent to and beneath a respective one of the right and left mounting brackets, the forward end of the seat assembly 96 is lowered to allow the right and left forward drop locks 30*a*, 30*b* to engage and be supported by the right and left horizontal support members 24*a*, 24*b*, respectively. The right and left forward mounting brackets 38*a*, 38*b* prevent forward movement of the seat assembly 96 in the wheelchair frame 16 as previously described. Positioned adjacent and coupled to each of the forward drop locks 30*a*, 30*b* is a respective one of the right and left locking mechanisms 40*a*, 40*b* as shown in FIG. 2. The right locking mechanism 40*a* shown in FIGS. 6 and 7 includes a locking member 166 which is pivotally coupled to the right forward drop lock 30*a* by means of a mounting pin 168 inserted through an aperture in the locking member as well as through a sleeve 31 attached to a lower portion of the right forward drop lock. With the mounting pin 168 inserted through the locking member 166 and the sleeve 31, the mounting pin 168 is maintained in position by means of a nut 172 engaging a threaded end of the mounting pin. A torsion spring 170 is positioned about the mounting pin 168 and is disposed between the locking member 166 and an adjacent end of the sleeve 31. One end of the torsion spring 170 is inserted in a second aperture 166*b* within the locking member 166. A second end of the torsion spring 170 is positioned between the sleeve 31 and a lower surface of the right forward drop lock 30*a*. The torsion spring 170 thus urges the locking member 166 in a counterclockwise direction of rotation as viewed in FIG. 6 so that an engaging end 166*a* of the locking member securely engages the horizontal support member 24*a* and prevents the seat assembly from being removed from the wheelchair base. The locking mechanism 40*a* is released by engaging an upper, inner portion of the locking member 166 and rotating it in a clockwise direction, as shown in dotted line form in FIG. 6, so that its engaging end 166*a* no longer engages the horizontal support member 24*a* whereupon the seat assembly can be easily removed from the wheelchair base. Inner portions of each of the forward drop locks 30*a*, 30*b* and aft drop hooks 32*a*, 32*b* are provided with one or more slots and apertures for receiving a mounting pin in an arrangement which allows the width of the seat assembly 96 to be adjusted to fit a range of support base widths.

The locking member 166 includes a third aperture 166*c* which may also be used for attaching the locking member to the forward drop lock 30*a* adjacent to the sleeve 31 thereon. By inserting the mounting pin 168 through the third aperture 166*c* in the locking member 166, a horizontal support member 24*a* having a larger diameter than that shown in FIGS. 6 and 7 may be used with the drop lock and locking mechanism combination.

Another feature of the present invention contemplates the use of remote actuation of each of the locking mechanisms 40*a*, 40*b* by a user for releasing the seat assembly from the wheelchair base. This can be accomplished by means of a pair of release cables 174 each coupled to a respective one of the locking members 166 by means of a cable coupling 176 as shown in FIG. 6. A single release cable 174 coupled to both of the locking members 166 would work equally as well. Pulling on the release cable 174 causes clockwise rotation of the locking member 166 and release of the locking mechanism 40*a* from the support member 24*a*. Thus, a single release mechanism in the form of a pair of release cables 174 attached to the foldable, flexible seating system of the present invention may be used to release the seating system from its support base and to remove it therefrom. This latter arrangement may be particularly useful when one who is handicapped removes the seating system from a wheelchair base.

Figure 8:
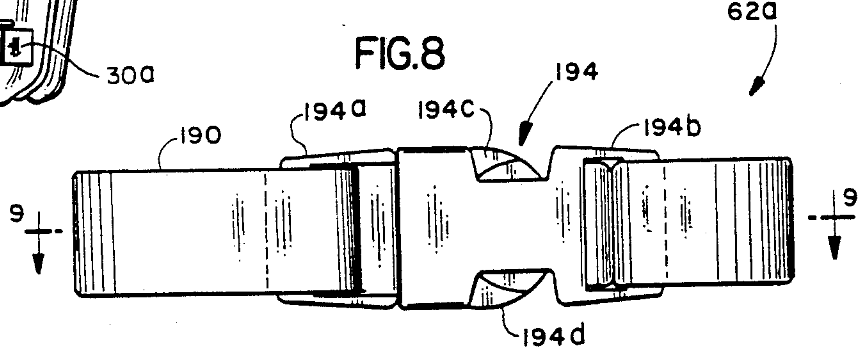
FIG. 8 is a side elevation view of a clip lock arrangement for securely attaching the back portion of the foldable, flexible seating system of the present invention to a wheelchair frame member.
Figure 9:
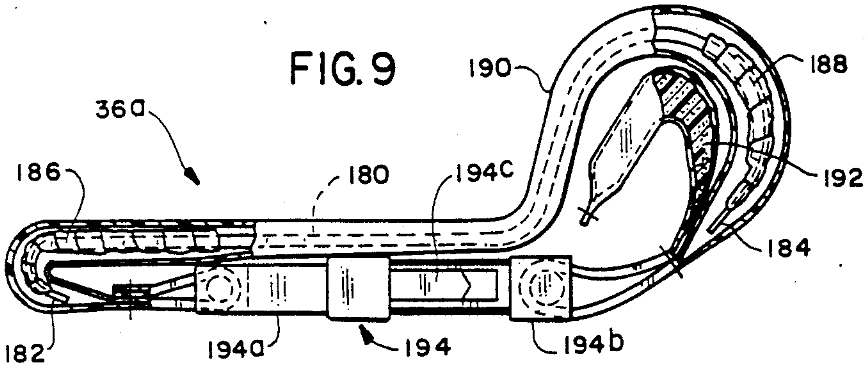
FIG. 9 is a sectional view of the clip lock arrangement illustrated in FIG. 8 taken along sight line 9—9 therein.

Referring to FIG. 8, there is shown a side elevation view of a clip lock 62*a* for use in the present invention. FIG. 9 is a horizontal sectional view of the clip lock 62*a* shown in FIG. 8 taken along sight line 9—9 therein. The clip lock 62*a* includes an outer webbing 190, preferably comprised of a high strength, durable material such as nylon. One end of the outer webbing 190 is inserted through and coupled to a male end 194*a* of a clip lock buckle 194. The other end of the outer webbing 190 is inserted through and coupled to a female end 194*b* of the clip lock buckle 194. The male end 194*a* of the clip lock buckle 194 is adapted for insertion in and secure engagement with the female end 194*b* thereof. The clip lock buckle 194 releases the male and female ends 194*a*, 194*b* by displacement of gripping portions 194*c* and 194*d* toward one another. The clip lock buckle 194 illustrated in the figures and contemplated for use in the present invention is commercially available and well known to those skilled in the relevant arts. However, the present invention contemplates the use of a wide variety of quick release mechanisms in the clip lock assembly used in the present invention.

Disposed within the outer webbing 190 is a clip lock hook 180 having an elongated, linear portion and a curvilinear portion. Attached to a first end of the clip lock hook 180 by a conventional means such as electric tape 186 is a first wear guard 182. Attached to a second end of the clip hook 180 also by conventional means such as electrical tape 180 is a second wear guard 184. While the clip lock hook 186 preferably comprised of a high strength, rigid material such as steel, each of the first and second wear guards 182, 184 is preferably comprised of a bendable, resilient material such as plastic. The wear guards 182, 184 prevent excessive wear of the outer webbing 190 caused by rubbing against the ends of the clip lock hook 180 as the clip lock 36*a* is manipulated during fastening and unfastening of the back assembly from the wheelchair base. The curvilinear end portion of the clip lock hook 180 is adapted to receive and engaged a vertical support member of the wheelchair frame. Disposed within the end of the outer webbing 190 adjacent to and within the curvilinear portion of the clip lock hook 180 is a pad 192. The pad 192 is preferably comprised of a compressible material and is adapted for intimate engagement between a vertical support member of the wheelchair frame and the curvilinear portion of the clip lock 62*a*. The pad 192 thus provides a snug fit between the clip lock 62*a* and a wheelchair frame vertical support member disposed therein while allowing the clip lock to slide up and down the vertical support member as the angle of recline of the seating system is changed at the pivot axis in the lower back. It is the sliding engagement with and coupling to each of the wheelchair frame vertical support members by the right and left clip locks 62*a* and 62*b* which allows for pivoting displacement between the upper and lower back portions of the seating system 10 of the present invention.

Figure 10:
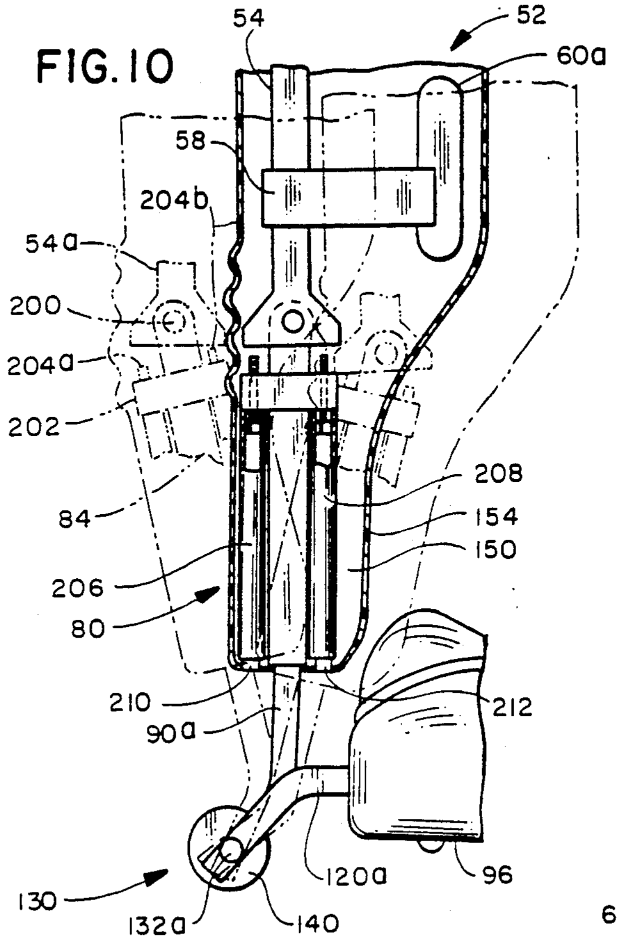
FIG. 10 is a sectional view of the lower back portion of the foldable, flexible seating system of the present invention illustrating an arrangement for limiting the forward and aft back flexure of the seating system.
Figure 11:
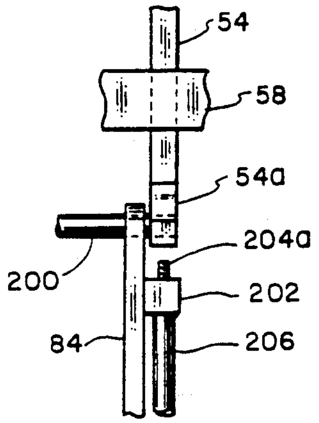
FIG. 11 is a rear elevation view of the flexure limiting arrangement of FIG. 10.

Referring to FIGS. 10 and 11, there are respectively shown lateral sectional and rear elevation views of an arrangement for limiting the forward and aft pivoting displacement of the upper back support frame 52 relative to the lower back support frame 80. In this arrangement, each of the upper back telescoping frame members 54 is provided with an enlarged, lower end portion 54*a*. The enlarged, lower end portion 54*a* of each of the upper back telescoping frame members 54 is pivotally coupled to a respective one of the back angle hinge bars 90*a*, 90*b* by means of a hinge pin 200. Securely coupled adjacent to respective upper ends of each of the back angle hinge bars 90*a*, 90*b* by conventional means such as a weldment is a mounting block 202. Each of the mounting blocks 202 is provided with a pair of apertures therein within which is inserted from beneath one of a pair of of each of the threaded stop pins 204*a* and 204*b* is a respective elongated, linear hollow tube 206 and 208. Each of the first and second hollow tubes 206, 208 extends downward through the back cushion 150 to a location adjacent to a respective aperture 210, 212 within the back cover 154. Thus, by inserting a tool such as a screwdriver or an Allen wrench through apertures 210 and 212 within the back cover 154 and up through the first and second hollow tubes 206, 208, the position of stop pins 204*a* and 204*b* may be adjusted within the mounting block 202. As shown in FIG. 10, for the figure shown in dotted line form on the right, the second threaded stop pin 204*b* limits forward pivoting displacement of the upper back support frame 52, while the first threaded stop pin 204*a* limits rearward pivoting displacement of the upper back support frame relative to the seat assembly 96. It should be pointed out here that while the embodiment described above and illustrated in FIGS. 10 and 11 makes use of forward and aft displacement stops, each of these displacement stops may be incorporated individually without the other in the present invention.

Figure 12:
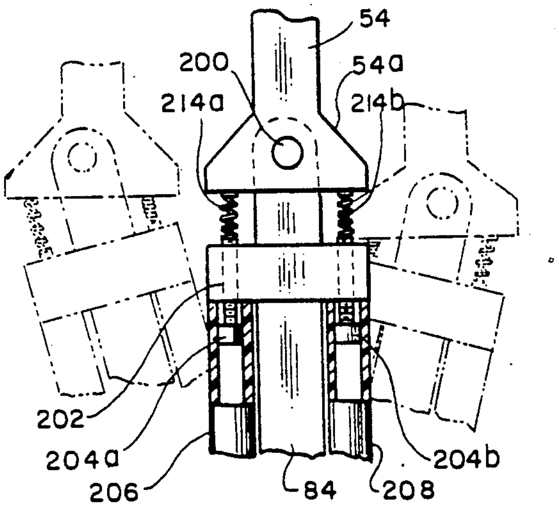
FIG. 12 is a lateral view shown partially cutaway of a coupling arrangement between the upper and lower back portions of the seating system for limiting forward and aft back flexure as well as for urging the upper back to a neutral position.
Figure 13:
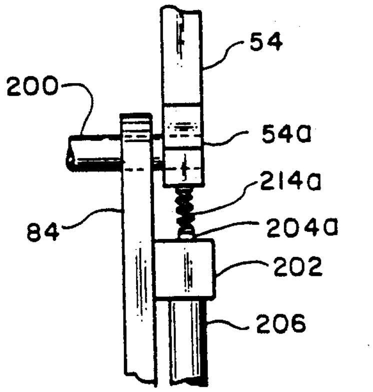
FIG. 13 is a rear elevation view of the flexure limiting and neutral point biasing arrangement of FIG. 12.

Referring to FIG. 12, there is shown a partially cutaway side elevation view of an arrangement for not only limiting forward and aft pivoting displacement of the upper back portion, but also for urging the upper back portion to an intermediate neutral position in accordance with yet another embodiment of the present invention. FIG. 13 is an aft elevation view of the pivot stop/neutral position biasing arrangement of FIG. 12. As in the case described above, each of the upper back telescoping frame members 54 is provided with an enlarged, lower end 54a adapted for coupling to the upper end of the H-shaped frame member 84 by means of a hinge pin 200. Each side of the H-shaped frame member 84 is provided with a respective mounting block 202 on its outer surface. Each of the mounting blocks 202 includes a pair of threaded apertures within which is inserted a respective one of the first and second stop pins 204a and 204b. A first hollow tube 206 is disposed in contact with a lower surface of the mounting block 202 and about the head of the first threaded stop pin 204a. A second hollow tube 208 is similarly positioned with respect to the mounting block 202 and the second threaded stop pin 204b. The first and second hollow tubes 206, 208 are maintained in position by coupling them to the H-shaped frame member 84 by conventional means such as an epoxy cement or electrical tape wrapped around each of the hollow tubes and the H-shaped frame member. The hollow tubes permit the threaded stop pins to be accessed from outside of the cushion and the forward and aft stops to be set external to the back assembly. The combination of the first threaded stop pin 204a and a first spring 214a limits aft pivoting displacement of the back assembly, while the second threaded stop pin 204b in combination with a second spring 214b limits forward pivoting displacement of the back assembly relative to the seat assembly. The first spring 214a is coupled to and extends from the distal end of the first threaded stop pin 204a. Similarly, the second spring 214b is coupled to and extends from the distal end of the second threaded stop pin 204b. Pivoting displacement of the back assembly stops upon full compression of one of the aforementioned springs. The first and second springs 214a, 214b also bias the back assembly to a given neutral position. Although the neutral position may be established as linear alignment between the upper back telescoping frame member 54 and the H-shaped frame member 84 as shown in FIG. 12, the neutral position may also be defined by the non-linear orientation of the telescoping frame member relative to the H-shaped frame member by appropriate selection of the length and compressive force of each of the first and second biasing springs 214a, 214b. The neutral point may also be established by rotating the first and second stop pins 204a and 204b to provide the desired biasing force in each of the first and second springs 214a, 214b. The forward and aft displacement limits of the back assembly may also be established by proper adjustment of the positions of the first and second threaded stop pins 204a and 204b within the mounting block 202. Finally, while the back assembly biasing and stop limits have been described as a combination in terms of forward and aft biasing and stop limits, it is readily apparent that the stop limits and biasing arrangements may be utilized independently and that the forward and aft stop limits and biasing arrangements are also independent from one another.

Figure 14:
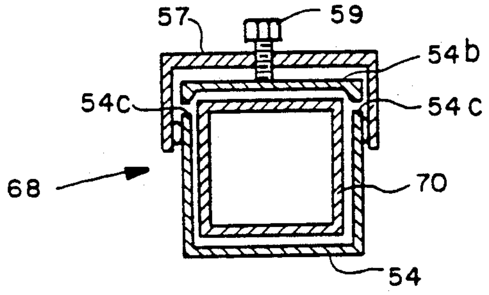
FIG. 14 is a sectional view showing the details of a friction lock used in the present invention as illustrated in FIG. 2 taken along sight line 14—14 therein.

Referring to FIG. 14, there is shown a horizontal sectional view of an upper friction lock 68 as shown in FIG. 2 taken along sight line 14—14 therein. While the following description is discussed in terms of the upper friction locks 68 used in an upper portion of the upper back support frame 52, it is equally applicable to the various other friction locks used in other telescoping portions of the foldable, flexible seating system of the present invention. As previously described, each of the telescoping support tubes 70 upon which the headrest 72 is positioned are adapted for sliding insertion in a respective one of the upper back telescoping frame members 54. A pair of slots 54c are provided for within the upper back telescoping frame member 54 in facing relationship. The slots 54c may be formed in a conventional manner such as by cutting facing upper edges of the telescoping frame member 54 so as to form a clamping portion 54b thereof. The clamping portion 54b extends over a short length, e.g., approximately one inch, of the upper end of the frame member 54 and is capable of being bent inwardly toward the center of the frame member in a resilient manner. An engaging collar 57 is securely attached to the upper edge portion of the telescoping frame member 54 by conventional means such as facing weldments. The engaging collar 57 is provided with a threaded aperture therein for receiving a threaded mounting pin 59. Rotational displacement of the mounting pin 59 causes it to engage the clamping portion 54b of the telescoping frame member 54. Further rotation and linear displacement of the mounting pin 59 results in engagement of the clamping portion 54b with a lateral portion of the inner telescoping support tube 70. It is in this manner that the support tube 70 may be locked in fixed, secure engagement with the upper back telescoping frame member 54. Release of the support tube 70 by the frame member 54 is accomplished by reverse rotation of the mounting pin 59 allowing the clamping portion 54b to be displaced from and release the inner telescoping support tube. This arrangement avoids direct contact between the two moving components of the friction lock 68, i.e., the inner telescoping support tube 70 and the mounting pin 59, and thus avoids excessive wear of and the possibility of damage to or breakage of either of these components. The friction locks of the present invention thus provide a highly reliable, safe and secure means for coupling two telescoping members in an arrangement having a long usable lifetime.

Referring to FIG. 4A, there is shown another arrangement for mounting a headrest 72 to the upper portion of the back assembly 98. The headrest mounting arrangement illustrated in FIG. 4 includes a lower, angled telescoping support tube 222 inserted in and supported by the upper friction lock 68. The upper friction lock 68 is positioned within the back cushion 150 and allows for upward and downward movement of the angled telescoping support tube 222 within the back assembly 98. Mounted to the upper end of the angled telescoping support tube 222 is a friction lock, or clamp, 224 within which is disposed an upper telescoping support tube 226. The upper telescoping support tube 226 is freely movable within the friction lock 224 and the angled telescoping support tube 222, but may be securely locked in position by the friction lock. Disposed on the upper end of the upper telescoping support tube 226 is a combination of a mounting bracket and a pivot pin 228 which, in turn, is attached to an aft portion of the headrest 72. The mounting bracket and pivot pin 228 combination allows for pivoting displacement of the headrest 72 on the distal end of the upper telescoping support tube 226. Movement of the lower, angled telescoping support tube 222 within the upper friction lock 68 permits the height of the headrest 72 to be adjusted as desired. Displacement of the upper telescoping support tube 226 within the friction lock 224 allows for forward and aft as well as up and down adjustment of the headrest 72. Disposed about the lower and upper telescoping support tubes 222, 226, friction lock 224, and mounting bracket and pivot pin 228 is a cover 230. The cover 230 extends between an upper edge of the back cushion 150 and the headrest 72 and in a preferred embodiment is comprised of corrugated, flexible tubing. The cover 230 provides an improved appearance for the headrest and support hardware and makes inadvertent changing of the headrest support hardware settings less likely.

Figures 15, 15A:
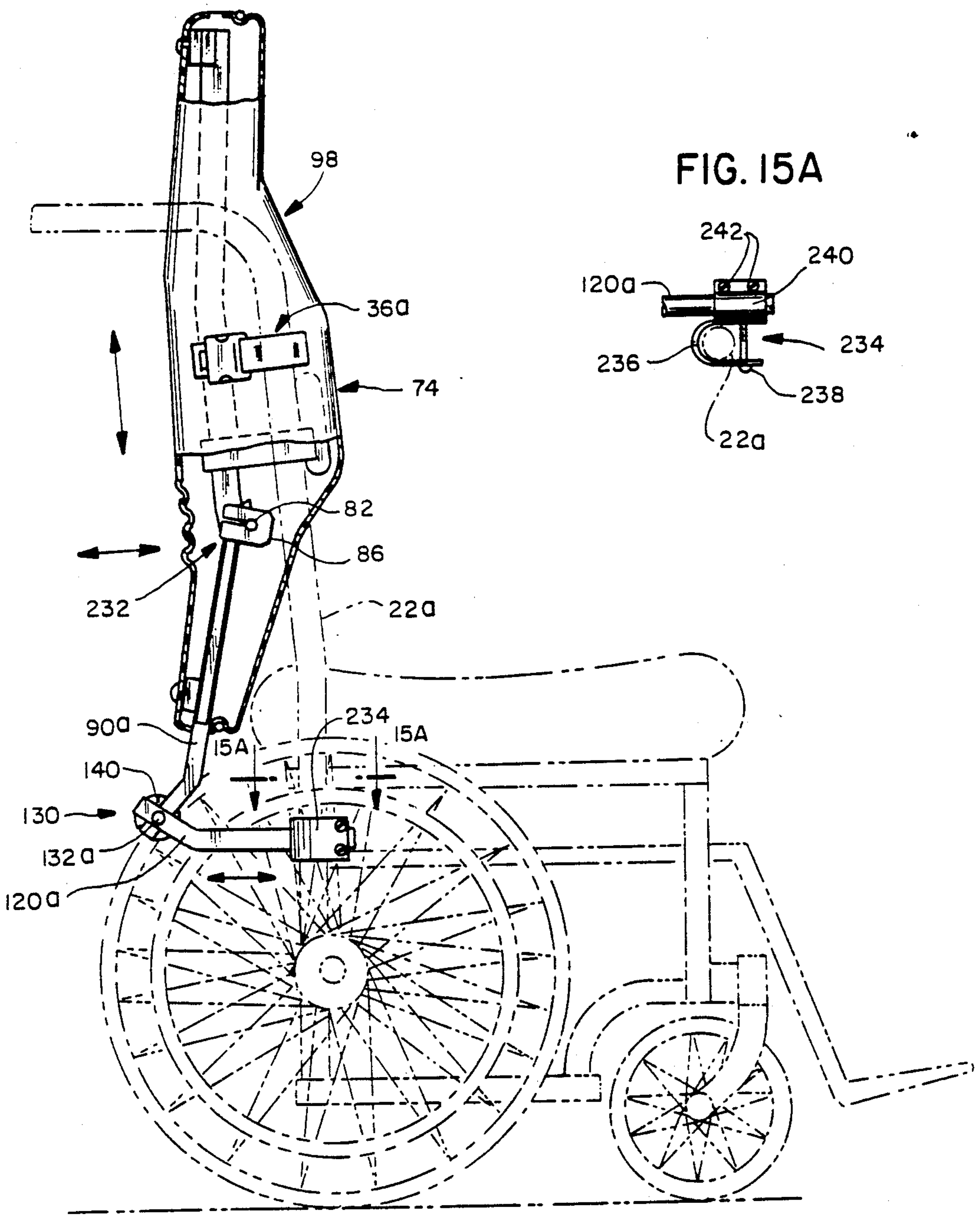
FIG. 15 is a lateral view, shown partially in phantom and partially cut away, of another embodiment of the invention wherein the back assembly is attached to a wheelchair base.
FIG. 15A is a sectional view taken along sight line 15A—15A in FIG. 15 illustrating the details of a clamping arrangement for attaching the back assembly to a wheelchair base.

Referring to FIG. 15, there is shown partially in phantom and partially cut away, a lateral view of another embodiment of a seating system 74 in accordance with the present invention. The seating system 74 illustrated in FIG. 15 is also coupled to a wheelchair base, shown in dotted line form, although this embodiment is comprised primarily of the hinged back assembly 98. Thus, the back assembly 98 is coupled to a right vertical support member 22*a* of the wheelchair base by means of the right clip lock 36*a*, with a similar arrangement provided for on the left side of the back assembly. The clip locks are free to slide up and down along the vertical support members of the wheelchair base to allow the back assembly 98 to flex by means of the hinge 232 disposed therein. The hinge, as previously described, includes the combination of a pair of clamps 86 and a hinge pin 82 which permit an upper portion of the back assembly 98 to be pivotally displaced relative to a pair of back angle hinge bars, with the right back angle hinge bar 90*a* shown in the figure. Each of the back angle hinge bars is pivotally coupled by means of a pivot pin to a respective one of the seat angle hinge bars. FIG. 15 shows the right back angle hinge bar 90*a* pivotally coupled to the right seat angle hinge bar 120*a* by means of the right pivot pin 132*a*. A similar arrangement is provided for on the left side of the seating system 74. As previously described, a handle and handle cover 140 is disposed along the pivot axis of the pivot pin 132*a* and allows the seating system 74 to be carried and stored in a convenient manner when removed from the wheelchair base.

Each of the seat angle hinge bars is coupled to a respective one of the wheelchair base vertical support members. Thus, the right seat angle hinge bar 120*a* is coupled to the right vertical support member 22*a* of the wheelchair base by means of a clamp 234. The clamps 234 permit the right and left seat angle hinge bars to be moved up and down along the vertical support members and also allow for forward and aft displacement and mounting of each of the seat angle hinge bars relative to a respective one of the wheelchair base vertical support members. By moving the seat angle hinge bars either forward or aft and up or down, the pivot axis defined by the pivot pin 132*a* as well as the flex point established by the location of the hinge 232 may be located where desired within the wheelchair base.

Referring to FIG. 15A, there is shown the details of the mounting bracket 234. The mounting bracket 234 includes first and second flange portions 236 and 240. Each of the flange portions is generally C-shaped, with the first flange portion 236 adapted to receive a wheelchair base vertical support member 22*a*, while the second flange portion 240 is adapted to receive one of the seat angle hinge bars 120*a*. Coupled to the first flange portion 236 are a pair of mounting bolts 238 which allow the first flange portion to securely engage the vertical support member 22*a* in a clamping manner. Similarly, a pair of mounting bolts 242 inserted through the second flange portion 240 of the clamp 234 allow the second flange portion to securely engage the seat angle hinge bar 120*a* in a clamping manner. Loosening of the aforementioned mounting bolts permits the seat angle hinge bars to be moved either forward or aft, as well as to be displaced upward or downward in the wheelchair base so as to provide adjustment for the size and comfort of a wheelchair base user.

Figure 16:
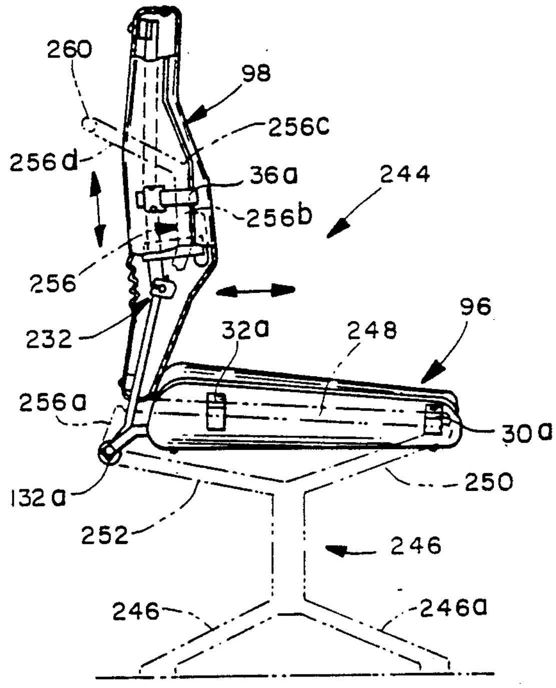
FIG. 16 is a lateral view, shown partially cut away and partially in phantom, of the seating system of the present invention integrated in a chair.

Referring to FIG. 16, there is shown yet another arrangement of a chair 244 incorporating the seating system of the present invention. The chair 244 includes a base 246 having a plurality of support legs 246*a*. The seat portion of the chair 244 includes forward and aft support members 250, 252 extending upward from the base 246. In one embodiment, the chair 244 includes right and left forward support members 250 as well as right and left aft support members 252. Coupled to and extending upward from the distal ends of each of the aft support members 252 is an upward extension, or riser, 256. Each of the left and right risers 256 includes a lower back member 256*a*, an intermediate back member 256*b*, and an upper back member 256*d*. The right and left upward extensions 256 are positioned adjacent to and outside of respective lateral edge portions of the back assembly 98. Each of the upward extensions 256 is preferably comprised of a rigid, angled, tubular member, with each of the right and left upward extensions coupled together at their upper ends by means of a cross-member 260. With each of the right and left upward extensions 256 positioned outside of and immediately adjacent to respective lateral edges of the back assembly 98, each of the clip locks is adapted to engage in a sliding manner the intermediate back member 256*b* of a respective one of the upward extensions 256, as shown in FIG. 16 for the case of the right clip lock 36*a* and the intermediate back member of the right upward extension. Pivoting displacement about the hinge 232 within the back assembly 98 allows for forward and aft displacement of a lower portion of the back assembly and upward and downward displacement of each of the clip locks along a respective one of the upper extensions. The chair support frame further includes right and left seat support members 248 which are securely engaged by the forward drop lock and aft drop hooks, as shown for the case of the right forward drop lock 30*a* and the right aft drop hook 32*a*. The forward drop locks and aft drop hooks thus provide secure, fixed coupling of the seat assembly 96 to the seat frame portion of the chair 244. As in the previously described embodiments of the invention, the back assembly 98 is freely pivotable with respect to the seat assembly 96 about the pivot pins, where the right pivot pin 132*a* is shown in FIG. 16.

Rearward displacement by a user of an upper portion of the back assembly 98 is limited by either engagement of an aft portion of the back assembly with the cross-member 260 or by positioning of the clip locks at the juncture of intermediate and upper back members of the upward extensions 256. Thus, as shown in FIG. 16, rearward displacement of an upper portion of the back assembly 98 will cause the clip lock 36*a* to be displaced upward along the intermediate back member 256*b* until it reaches the upper back member 256*d*. The angle between the intermediate and upper back member 256*b* and 256*d* prevents further displacement of the clip lock 36*a* and limits rearward movement of the back assembly 98.

Figure 17:
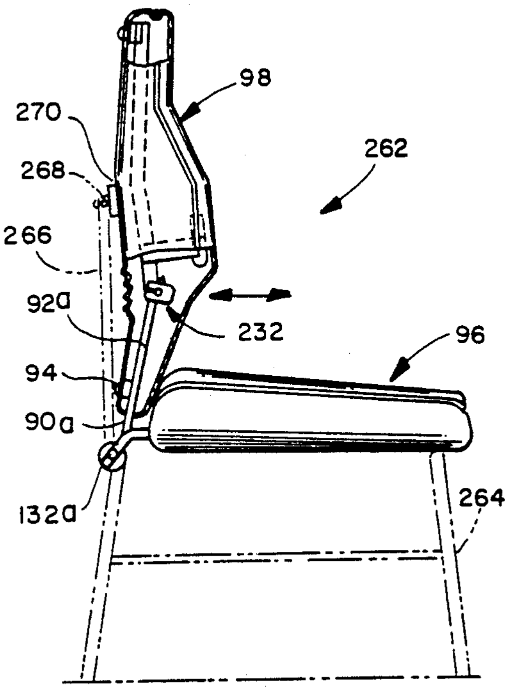
FIG. 17 is a lateral view, showing a partially cut away and partially in phantom, of another arrangement for incorporating the seating system of the present invention in a chair.

Referring to FIG. 17, there is shown yet another arrangement of a chair 262 incorporating the seating system of the present invention. In the embodiment of FIG. 17, the seat assembly 96 is fixedly attached to the base 264 of the chair 262. Again, the back assembly 98 is freely pivotable relative to the seat assembly 96 about the pivot pin 132*a*. The chair 262 includes one, or perhaps two, coupling members 266 rigidly coupled to the base 264 and extending upward therefrom. An upper end of the coupling member 266 is coupled to a second pivot pin 268 which is inserted through a coupling bracket 270 which, in turn, is securely mounted to an aft portion of the back assembly 98. Flexing of the back assembly 98 by means of the hinge 232 therein causes an upper portion of the back assembly to be pivotally displaced about the upper pivot pin 268 and a lower portion of the back assembly to be pivotally displaced about pivot pin 132*a*. Flexure of the back assembly 98 by means of the hinge 232 therein also results in forward or aft displacement of an intermediate portion of the back assembly as shown by the arrow in FIG. 17. With the coupling member 266 rigidly attached to and extending upward from the base 264 of the chair 262, the two pivot pins 132*a*, 268 are maintained in fixed position relative to one another. The pivoting action of the upper and lower portions of the back assembly 98 is accommodated for means of the telescoping action between the back angle hinge bar 90*a* and the hollow tube 92*a* which are both components of a lower portion of the back assembly 98. Thus, rearward pressure applied to an upper portion of the back assembly 98 causes the hinge 232 to be displaced forwardly resulting in extension of the telescoping combination of the back angle hinge bar 90*a* and the hollow tube 92*a*. On the other hand, rearward displacement of a lower portion of the back assembly 98 causes more of the back angle hinge bar 90*a* to be displaced into the hollow tube 92*a* in a telescoping manner. Thus, with upper and lower portions of the back assembly 98 pivotally coupled to respective portions of the chair 262, flexure of the back assembly is provided by means of the telescoping extension and retraction of the back angle hinge bars and hollow tubes within a lower portion of the back assembly. The telescoping arrangement illustrated in FIG. 17 may also be practiced by fixedly coupling the clip locks to an upright support of the chair, while allowing the clip locks to pivot freely. This latter arrangement would eliminate the need for the coupling member 266 shown in FIG. 17.

Figure 18:
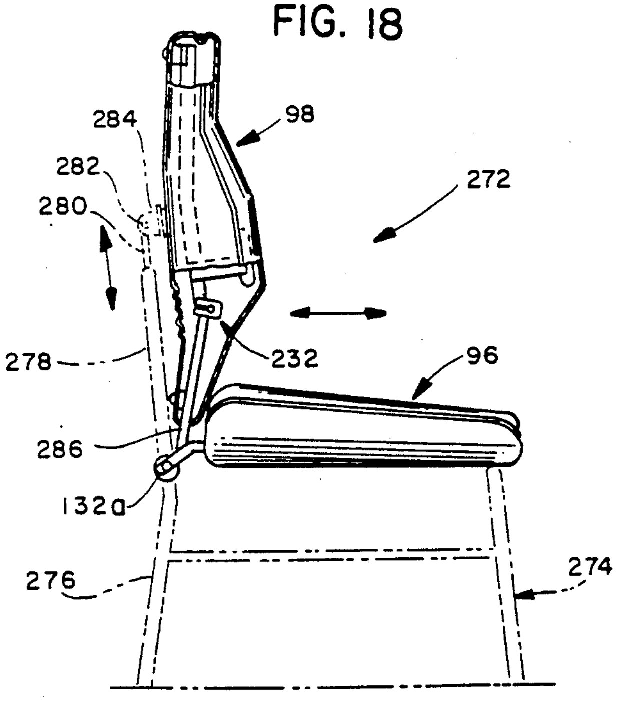
FIG. 18 is a lateral view, showing partially in phantom and partially cut away, of yet another arrangement for incorporating the seating system of the present invention in a chair.

Referring to FIG. 18, there is shown yet another embodiment of a chair 272 incorporating the seating system of the present invention. As in the previously described embodiment, the chair 272 includes a base 274 having an aft, lower support member 276. Extending upward from the lower support member 276 is an upper support member 278, with the two support members rigidly coupled together to form a unitary structure. The upper support member 278 may be comprised of a single tubular member, or a pair of tubular members disposed adjacent to respective lateral, aft portions of the chair 272. As in the previous embodiments, the back assembly 98 is pivotally coupled to the seat assembly 96 by means of one or a pair of pivot pins 132*a*. The hinge 232 within the back assembly 98 allows for its flexure. Securely attached to an aft portion of the back assembly 98 is a coupling bracket 284 through which is inserted a pivot pin 282. A telescoping support tube 280 is inserted in and along the length of the upper support member 278, while an upper end of the support tube is pivotally coupled to the coupling bracket 284 by means of the pivot pin 282. Flexure of the back assembly 98 at its hinge 232 causes either upward or downward displacement of the telescoping support tube 280 within the upper support member 278. Thus, rearward pressure applied to an upper portion of the back assembly 98 will cause forward displacement of the hinge 232 and downward displacement of the telescoping support member 280 within the upper support member 278. Rearward displacement of a lower portion of the back assembly 98 will result in extension of the telescoping support tube 280 out of the upper support member 278. In the embodiment of FIG. 18, the back assembly 98 may include a pair of unitary, non-telescoping solid back angle hinge bars 286, which are pivotally coupled to the seat assembly 96 by means of a respective pivot pin 132*a*. The embodiments of the present invention illustrated in FIGS. 16, 17 and 18 provide examples of integration of the seating system in a conventional chair frame. The seating system may either be permanently installed in the chair or may be removable therefrom as previously described.

There has thus been shown a foldable, flexible seating system for mounting to a base having an internal, multisection support frame positioned within seat and back cushions and thus hidden from view for improved aesthetics yet can be coupled directly to the support frame for secure, stable positioning of the seating system. Seat and back internal support frames are pivotally coupled by means of a handle assembly which allows the seating system to be folded into a compact structure when removed from the support base to facilitate its transport and storage. Various components of the internal support frames are accessible even when completely encapsulated within back and seat foam cushions to allow various adjustments to be made to the size and support characteristics of the seating system. The back and seat assemblies are quickly and easily mounted to or removed from a support base such as a wheelchair and allow for pivoting displacement between the back and seat assemblies when securely mounted to a fixed wheelchair support frame while providing lumbo-sacral extension for a reclined user. In other embodiments, the hinged back assembly may be coupled by itself to a support base or the flexible seating system may be integrated in a rigid chair frame while still allowing for flexion and extension of the spine.

While particular embodiments of the present invention have been shown and described, it will be obvious to those skilled in the art that changes and modifications may be made without departing from the invention in its broader aspects. For example, while the various embodiments disclosed herein are not described as including all of the features of various other embodiments for the sake of brevity, it is to be understood that all of the features of any one embodiment can be incorporated in all other embodiments, if desired. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A seating system adapted for secure mounting to and easy removal from a support base, said seating system comprising:

a seat assembly having a first internal support frame disposed within a seat cushion, said seat assembly further including first mounting means coupled to said first internal support frame and extending out of said seat cushion for securely coupling said seat assembly to the support base;

a back assembly having a second internal support frame disposed within a back cushion, said base assembly further including second mounting means coupled to said second internal support frame and extending out of said back cushion for securely coupling said back assembly to the support base; and coupling means for pivotally coupling said seat and back assemblies for allowing the seating system to assume a compact, folded configuration when removed from the support base, said coupling means including handle means to permit secure gripping of the seating system and facilitate its transport.

2. The seating system of claim 1 wherein said back assembly includes upper and lower back support frames pivotally coupled together to allow for flexure of a lower portion of said back assembly and lower back extension of a user of said seating system.

3. The seating system of claim 2 wherein said lower back support frame includes a plurality of telescoping members for allowing the length of a lower back portion of the seating system to be adjusted in accordance with the size of a user.

4. The seating system of claim 1 wherein said first internal support frame includes a plurality of telescoping members for allowing the length of said seat assembly to be adjusted in accordance with the size of a user.

5. The seating system of claim 1 wherein said second internal support frame includes a deformable cross member adapted for shaping in accordance with the contour of a back support surface of a user.

6. The seating system of claim 1 wherein said coupling means includes at least one pivot pin coupling said first and second internal support frames and defining a pivot axis about which said seat and back assemblies pivot when said seat system assumes the compacted, folded configuration.

7. The seating system of claim 2 wherein said back assembly further includes hinge means disposed within said back cushion for pivotally coupling said upper and lower back support frames and allowing for forward and aft pivoting displacement of said upper back support frame relative to said lower back support frame.

8. The seating system of claim 7 wherein said hinge means includes first stop means disposed within said back cushion for limiting forward pivoting displacement of said upper back support frame relative to said lower back support frame.

9. The seating system of claim 8 wherein said first stop means is adjustable to allow for forward pivoting displacement of said upper back support frame over a range of displacement values.

10. The seating system of claim 7 wherein said hinge means includes second stop means disposed within said back cushion for limiting aft pivoting displacement of said upper back support frame relative to said lower back support frame.

11. The seating system of claim 10 wherein said second stop means is adjustable to allow for aft pivoting displacement of said upper back support frame over a range of displacement values.

12. A seating support arrangement comprising:

a support structure including a seat integral therewith for engaging and supporting buttocks and thigh portions of a user;

a back assembly for engaging and supporting a back portion of a user;

first mounting means pivotally coupled to said back assembly for mounting said back assembly to said support structure in a removable manner;

second mounting means for coupling an upper portion of said back assembly to said support structure in a removable manner; and hinge means in said back assembly for displacing a lower portion of said back assembly forward upon rearward displacement of an upper portion of said back assembly by a user, wherein said back assembly includes upper and lower internal support frames pivotally coupled by said hinge means.

13. The seating support arrangement of claim 12 wherein a lower back portion of the user undergoes extension and a portion of the user's weight may be removed from said seat for enhanced user comfort.

14. The seating support arrangement of claim 13 wherein said back assembly includes upper and lower internal support frames pivotally coupled by said hinge means, and wherein said lower back support frame includes a plurality of telescoping members for allowing the length of a lower portion of said back assembly to be adjusted in accordance with the size of a user.

15. The seating support arrangement of claim 13 wherein said back assembly includes an internal support frame having a deformable cross member adapted for shaping in accordance with the contour of a back support surface of a user.

16. The seating arrangement of claim 13 wherein said back assembly and said first mounting means each include respective coupled angle hinge bar portions to permit said back assembly and said mounting means to assume a closely spaced, parallel alignment when in a folded configuration after removal from said support structure.

17. The seating support arrangement of claim 13 wherein said hinge means includes locking means for securing said back assembly in a given fixed configuration.

18. The seating support arrangement of claim 13 wherein an aft lower surface of said back assembly includes a plurality of spaced corrugations to facilitate flexure of a lower portion of said back assembly.

19. A seating arrangement for mounting to a rigid support base having first and second structural members, said seating arrangement comprising:

a seat support;

a flexible back support pivotally coupled to an aft portion of said seat support;

first coupling means for fixedly mounting said seat support to the first structural members of the support base; and second coupling means for attaching said back support to the second structural members of the support base in a sliding manner so as to allow an upper portion of said back support to be displaced along and in engagement with the second structural members as said back support is flexed.

20. The seating arrangement of claim 19 wherein said first coupling means includes aft positioning and support means and forward locking means.

21. The seating arrangement of claim 20 wherein said forward locking means includes a plurality of support hooks each adapted to receive a respective first structural member and a plurality of manually operated locking members each movable between first and second positions and adapted to engage a first structural member when in said first position.

22. The seating arrangement of claim 19 wherein said second coupling means includes a plurality of hook members attached to said back support and adapted to engage a respective one of said second structural members.

* * * * *

UNITED STATES PATENT AND TRADEMARK OFFICE
CERTIFICATE OF CORRECTION

PATENT NO. : 5,035,467

DATED : July 30, 1991

INVENTOR(S) : Peter Axelson, et al.

It is certified that error appears in the above-identified patent and that said Letters Patent is hereby corrected as shown below:

The title page should be deleted, to appear as per attached title page.

United States Patent [19]
Axelson et al.

[11] Patent Number: 5,035,467
[45] Date of Patent: Jul. 30, 1991

[54] SEATING SYSTEM

[75] Inventors: Peter Axelson; Michael Heinrich, both of Santa Cruz; Ann Lasko-Harvill, Palo Alto, all of Calif.; Michael W. Silverman, Highland Park, Ill.

[73] Assignee: Pin Dot Products, Niles, Ill.

[21] Appl. No.: 244,843
[22] Filed: Sep. 15, 1988
[51] Int. Cl.[5] .......................... B60N 1/02; A47C 1/12
[52] U.S. Cl. .................................... 297/440; 297/284
[58] Field of Search ............... 297/330, 331, 218, 229, 297/440, 444, 397, 398, DIG. 4, 378, 250, 253, 254, 255, 170, DIG. 4, 284, 379, 352

[56] References Cited

U.S. PATENT DOCUMENTS

| | | | |
|---|---|---|---|
| 2,119,023 | 5/1938 | Pickard | 297/253 |
| 2,260,352 | 10/1941 | Trapini | 297/255 |
| 2,634,794 | 4/1953 | Young | 297/255 X |
| 2,710,647 | 6/1955 | Dorton . | |
| 3,171,686 | 3/1965 | Evers | 297/251 |
| 3,279,848 | 10/1966 | Walker | 297/256 |
| 3,404,917 | 10/1968 | Smith | 297/250 |
| 3,594,039 | 7/1971 | Hard | 297/378 X |
| 3,632,165 | 1/1972 | Miller | 297/254 |
| 3,929,374 | 12/1975 | Hogan et al. . | |
| 3,945,651 | 3/1976 | Boswinkel . | |
| 3,947,067 | 3/1976 | Griefahn . | |
| 3,982,785 | 9/1976 | Ambasz . | |
| 4,120,530 | 10/1978 | Imbro . | |
| 4,157,203 | 6/1979 | Ambasz . | |
| 4,234,228 | 11/1980 | Flamm . | |
| 4,285,544 | 8/1981 | Zapf . | |
| 4,300,249 | 11/1981 | Taylor . | |
| 4,333,683 | 6/1982 | Ambasz . | |
| 4,362,335 | 12/1982 | Drabert et al. . | |
| 4,364,603 | 12/1982 | Johnson . | |
| 4,408,800 | 10/1983 | Knapp . | |
| 4,458,942 | 7/1984 | Crossman . | |
| 4,471,994 | 9/1984 | Zund et al. . | |
| 4,533,177 | 8/1985 | Latone . | |
| 4,555,136 | 11/1985 | Dranger . | |
| 4,573,736 | 3/1986 | Kevenberg . | |
| 4,574,901 | 3/1986 | Joyner . | |
| 4,603,904 | 8/1986 | Tolleson . | |
| 4,618,185 | 10/1986 | Kaufman . | |
| 4,626,028 | 12/1986 | Hatsutta et al. . | |
| 4,629,249 | 12/1986 | Yamaguchi . | |
| 4,640,547 | 2/1987 | Fromme . | |
| 4,641,884 | 2/1987 | Miyashita et al. . | |
| 4,652,049 | 3/1987 | Maruyama . | |
| 4,685,730 | 8/1987 | Linguanotto . | |
| 4,687,250 | 8/1987 | Esche . | |
| 4,688,851 | 8/1987 | Whiteford . | |
| 4,703,974 | 11/1987 | Brauning . | |
| 4,707,028 | 11/1987 | Gamberini . | |
| 4,709,963 | 12/1987 | Uecker et al. . | |
| 4,711,491 | 12/1987 | Ginat . | |
| 4,712,835 | 12/1987 | Warrick . | |
| 4,728,150 | 3/1988 | Gaudreau, Jr. . | |
| 4,730,871 | 3/1988 | Sheldon . | |
| 4,733,910 | 3/1988 | Brennan . | |
| 4,744,603 | 5/1988 | Knoblock . | |
| 4,934,755 | 6/1990 | Berghoff | 297/284 |

*Primary Examiner*—Peter A. Aschenbrenner
*Attorney, Agent, or Firm*—Emrich & Dithmar

[57] ABSTRACT

A seating system includes seat and back internal support frames disposed within respective foam-filled seat and back cushions which each have an outer fabric cover. The back assembly is provided with a pair of quick-release clip locks, while the seat assembly includes a plurality of support hooks in combination with mounting brackets and locking mechanisms to facilitate quick mounting and removal of the seat from a support frame such as a wheelchair base. The seat and back assemblies are coupled together in a pivoting manner by means of a handle assembly which allows the seat to be compactly folded and easily carried when removed from a support base. The back inner support frame includes upper and lower support subassemblies pivotally coupled by means of a hinge joint which allows for extension of the lumbar region when the upper support subassembly is moved rearwardly to a reclined position. The seat and back support surfaces are contoured for user comfort and support while a lower, aft portion of the back cushion is provided with a plurality of corrugations to facilitate its flexure. The internal support frame includes telescoping members to allow the internal frame to fit a range of user sizes while the hinge joint in the lower portion of the back assembly may: (1) be locked in a fixed orientation; (2) incorporate forward and aft stops to limit pivoting displacement of the upper back; or (3) have a selected neutral position to which the upper back is biased.

22 Claims, 8 Drawing Sheets

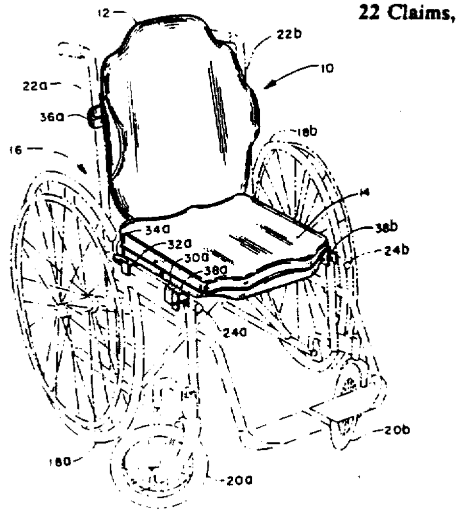

UNITED STATES PATENT AND TRADEMARK OFFICE
CERTIFICATE OF CORRECTION

PATENT NO. : 5,035,467

DATED : July 30, 1991

INVENTOR(S) : Peter Axelson et al.

It is certified that error appears in the above-identified patent and that said Letters Patent is hereby corrected as shown below:

Col. 2 / Line 61: "user s" should be --user's--.

Col. 8 / Line 56: "118aand " should be --118a and--.

Col. 9 / Line 31: After "assemblies" insert --96, 98--.

Col. 11 / Line 59: "180" should be --186--.

Col. 11 / Line 60: "186" should be --180 is--.

Col. 12 / Line 37: After "204b" insert --. Positioned about the head of each of the threaded stop pins 204a and 204b--.

IN THE CLAIMS:

Col. 19 / Line 4: "base" should be --back--.

Col. 20 / Line 17: "13" should be --12--.

Col. 20 / Line 24: "13" should be --12--.

UNITED STATES PATENT AND TRADEMARK OFFICE

CERTIFICATE OF CORRECTION

PATENT NO. : 5,035,467

DATED : July 30, 1991

INVENTOR(S) : Peter Axelson et al

It is certified that error appears in the above-indentified patent and that said Letters Patent is hereby corrected as shown below:

Col. 20 / Line 27: "13" should be --12--.

Col. 20 / Line 36: "13" should be --12--.

Col. 20 / Line 40: "13" should be --12--.

Signed and Sealed this

Eighteenth Day of January, 1994

Attest:

BRUCE LEHMAN

*Attesting Officer*

*Commissioner of Patents and Trademarks*